Patented Apr. 22, 1941

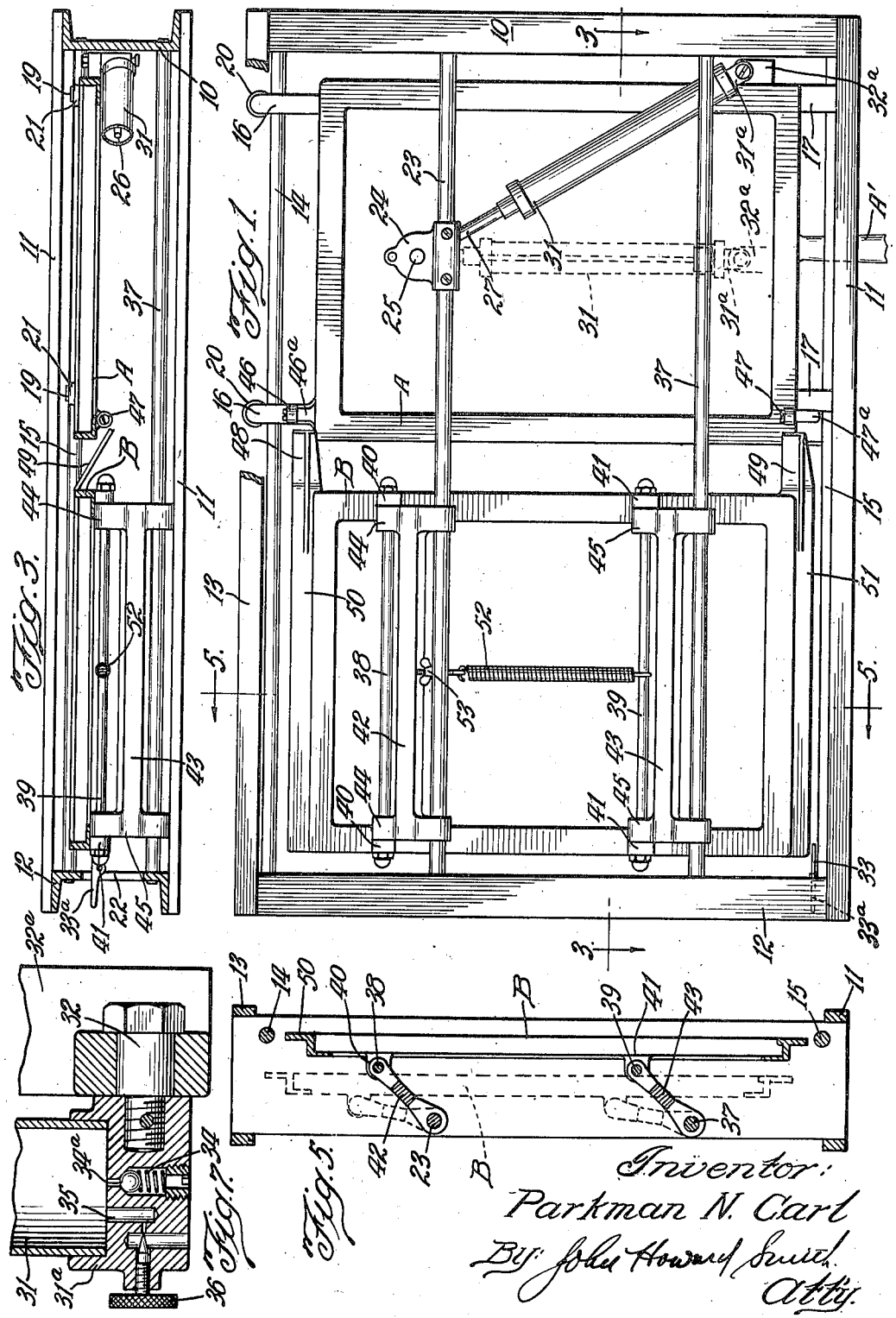

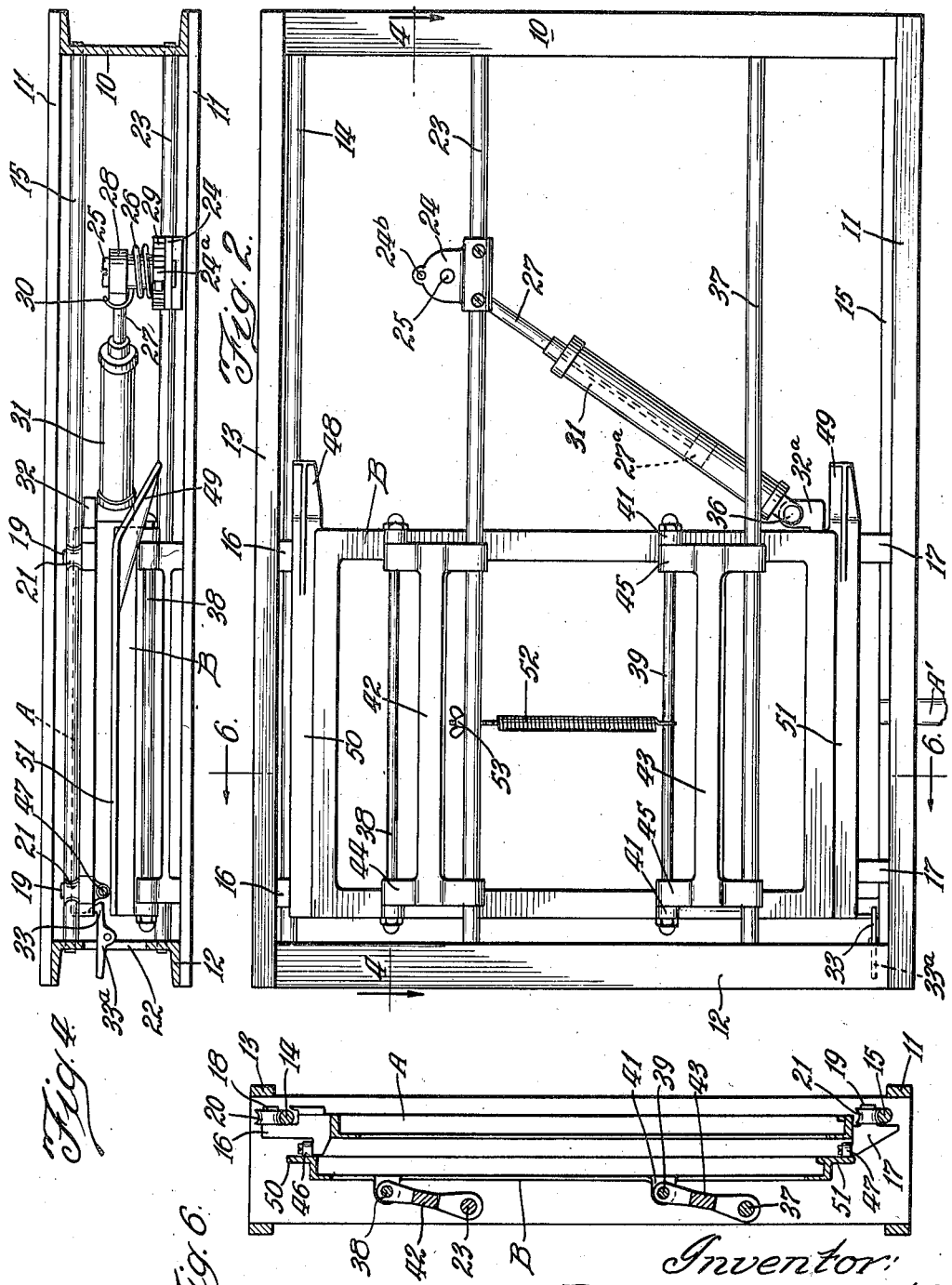

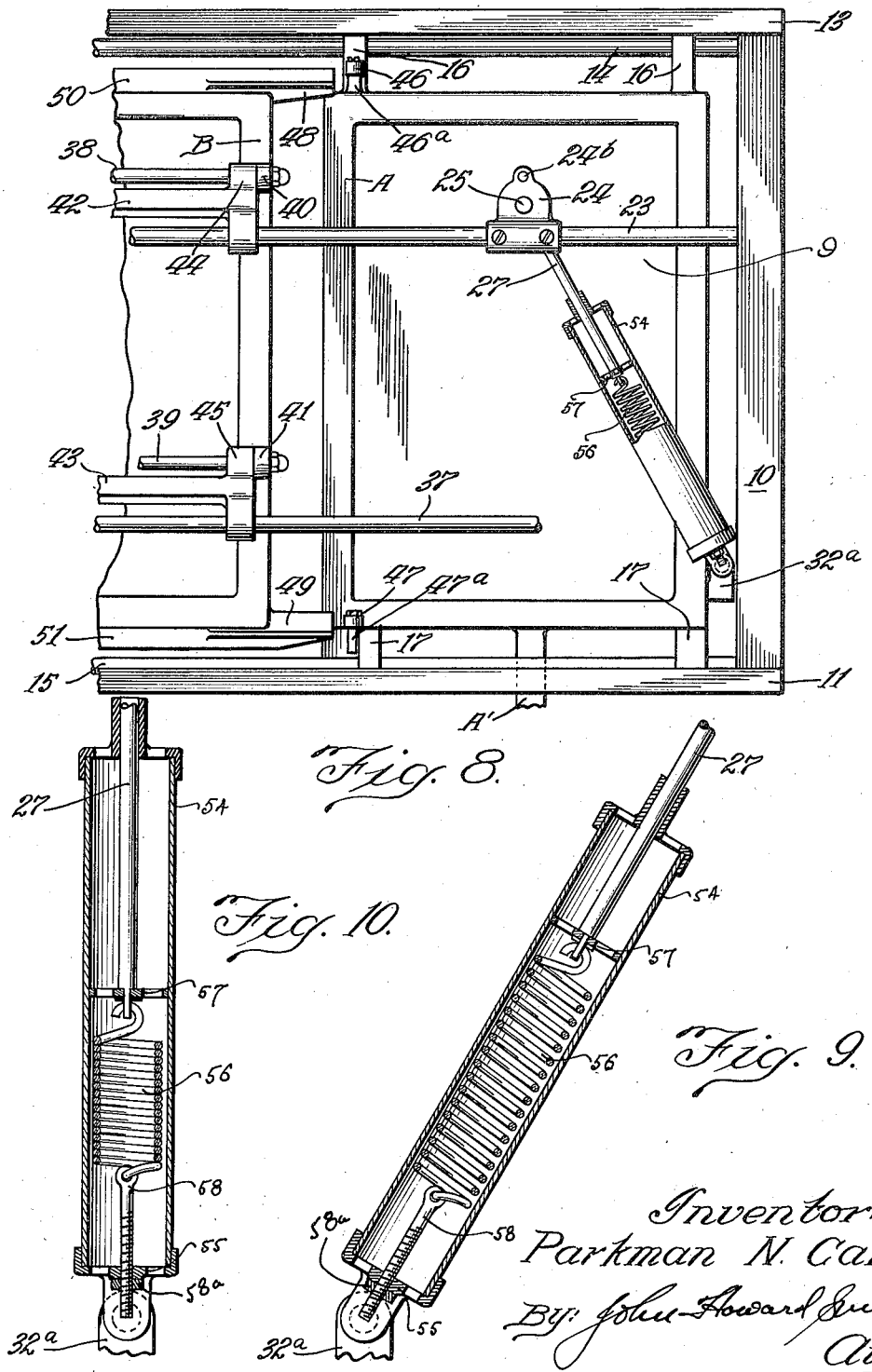

2,239,219

UNITED STATES PATENT OFFICE 2,239,219

X-RAY CASSETTE CHANGER

Parkman N. Carl, Chicago, Ill., assignor to George W. Brady & Co., Chicago, Ill., a corporation of Illinois Application March 29, 1939, Serial No. 264,720

13 Claims. (Cl. 250—66)

The invention relates to cassette changers for use in X-ray photography where the exposure of stereoscopic views is made. More particularly the invention is directed to improvements in a two-station horizontally operating cassette changer of the above character.

In the past certain difficulties have been encountered in the construction and use of devices of the above character. Among these difficulties are that the devices are not well adapted to general use in a doctor's office because they are large and cumbersome, have involved, complicated mechanisms which get out of order and which require considerable experience and practice to be operated. Furthermore, the devices of the past have been cumbersome and have involved structural complications which make them too costly for ordinary, general use. Another disadvantage of the past devices has been that the jarring of the entire mechanism during the cassette changing or transporting operation is increased proportionately with the speed of movement thereof, and since a minimum lapse of time must exist between the two exposures in order to give the stereoscopic view, the necessary increase in speed of movement during the cassette changing operation brought about a proportionate increase in the jarring of the mechanism, with the result that imperfect exposures were too often obtained.

Consequently, to obviate the above disadvantages, and as principal objects of the invention, there is provided herein a plate changing mechanism having extremely compact transporting means for moving the forward cassette holder laterally with maximum speed, while at the same time affording a very efficient buffer for absorbing shock movement when this lateral motion of the cassette holder terminates; a cam arrangement whereby locks and the like for the rear cassette holder are eliminated, whereby said holder drops into exposure position automatically in response to completion of the lateral movement of the forward cassette holder, and whereby the former holder is returned to its rearward position automatically upon return movement of the forward cassette holder to exposure position; and a mounting mechanism for the rear cassette holder whereby the latter drops into exposure position by gravity and is provided with means for preventing jarring movement of the mechanism as it reaches exposure position.

More specifically the invention is directed to the provision of a cassette holder propelling mechanism embodying a simple coil torsion spring and a vacuum creating arrangement wherein the vacuum is negligible during most of the movement of the laterally moving cassette holder but increases greatly toward the end of the movement of travel of the latter to serve as a shock absorber and as a braking mechanism to prevent jarring at the termination of the movement, thereby eliminating the necessarily lengthy springs and necessarily long and cumbersome compression chamber used in devices heretofore.

Still another object of the invention is to provide a novel check valve-regulating valve arrangement on the vacuum mechanism whereby the return movement of the forward cassette holder is made with considerable ease in spite of the fact that a strong braking vacuum is afforded at the end of the operating movement thereof.

Still another object of the invention is to provide a device of the above character which works through its return movement with ease, requiring no great effort, and which at the same time does not utilize counterbalances.

Still another object of the invention is to provide a cassette changer which operates efficiently but independently of the weight of the cassettes and is not reliant upon a perfectly balanced system. Consequently cassettes of different weights may be used in the device.

Other objects and advantages will become apparent from the following description and appended drawings, in which:

Fig. 1 represents a rear view of the entire mechanism showing the forward cassette holder in its inoperative position, that is, removed from the exposure position;

Fig. 2 is a similar view of the entire mechanism showing the forward cassette holder moved into its operative or exposure position;

Fig. 3 is a section taken on the line 3—3 of Fig. 1;

Fig. 4 is a section taken on the line 4—4 of Fig. 2;

Fig. 5 is a section taken on the line 5—5 of Fig. 1;

Fig. 6 is a section taken on the line 6—6 of Fig. 2;

Fig. 7 is a detail view of the check valve regulating valve mechanism associated with the lower end of the vacuum cylinder;

Fig. 8 represents a broken view of the rear of a modified form of the mechanism;

Fig. 9 is a cross section of the cassette movement controlling element in an extended position; and Fig. 10 is a cross section of the cassette movement controlling element in its contracted position.

Referring particularly to Figs. 1 and 2; 10, 11, 12 and 13 represent elements of a frame at each side and at the top and bottom of the mechanism within which the remainder of the mechanism is housed. The rear of this frame is open, as shown at Figs. 1 and 2, while the left front half thereof constituting the exposure or operative station is open to permit exposures to be made, and the right half front constituting the inoperative or opaque station is covered with a sheet of lead 9 or the like (see Fig. 8) which is impenetrable to the X-rays to afford protection to the forward cassette holder when the latter is moved into the position shown in Fig. 1.

Extending across the top of the frame beneath the element 13 and between the side elements 10 and 12 of the frame is a rod or rail 14. A similar rod or rail 15 extends across the bottom of the frame between the side elements 10 and 12. These rods are adapted to permit lateral travel of the forward cassette holder in a manner to be presently described.

The particular construction of the cassette holders is not material in the present instance. They are designated generally by A, representing the forward cassette holder, and B, representing the rear cassette holder, and comprise generally a rectangular frame adapted to receive a cassette and hold it securely in the proper plane. When moved, these holders carry the respective cassette through their movement. The forward cassette holder is provided with a pair of upstanding lugs 16 and a pair of depending lugs 17. Fixedly secured toward the extremity of each of the lugs 16 and 17 are studs 18 and 19 respectively, upon which a pair of rollers 20 and 21 are rotatably mounted, these rollers 20 and 21 being adapted to ride upon the rods 14 and 15 respectively. Thus it will be understood that smooth and frictionless lateral movement of the forward cassette holder A is made possible. In order that the cassette holders may be loaded and unloaded, the frame element 12 may be cut away as at 22 in order that the cassettes may be inserted into the respective holders from the side of the housing frame.

Improved means for controlling the lateral movement of the forward cassette holder consists in a combined spring-vacuum mechanism including generally a coil spring and a cooperating piston, cylinder arrangement. A supporting rod 23 is shown suitably mounted across the entire frame between the frame elements 10 and 12, and is adapted to support a casing 24 which in turn supports a stud 25 around which is coiled a spring 26. Thus it will be seen that the casing together with the stud and spring is mounted in a manner to prevent relative movement between this mechanism and the entire frame work. A piston rod 27 has a loop element 28 at its upper end, this element also being received by the forward portion of the stud 25 to rotate thereon during the operation to be explained presently. A circular ratchet 29 is secured to the rear face of the casing 24 and is adapted to anchor the rear end of the spring 26 while the forward end thereof is bent around the upper end of the piston rod 27 as shown at 30. The lower end of the rod 27 carrying the usual piston 27a extends into a cylinder 31, the lower end of which is closed by a casing element 31a which is in turn pivotally secured as at 32 to a bracket 32a mounted on the lower side of the forward cassette holder A.

Referring to Fig. 2 it will be seen that when the forward cassette holder A has been removed to its operative position in readiness for the exposure of the photograph, as by manipulation through a handle A' depending therefrom, the piston rod 27 and cylinder 31, constituting a unitary arm, will have assumed a given position of angularity. When in this position the coil spring 26 will have been contracted about the stud 25 by the engagement of the looped end 30 with the upper end of the piston rod, with the result that the spring-piston rod-cylinder arrangement will be in readiness to draw the cassette holder A rapidly through a lateral path in order to remove it from the exposure station and permit the exposure of the second picture upon the rear cassette holder. As the cassette holder A is moved into its operative position it is maintained there by any suitable latch mechanism, such as that indicated at 33. As soon as the first exposure has been made it is necessary to manipulate the handle 33a of the latch 33, whereupon the spring 26, being under tension, will force the piston rod-cylinder combination angularly laterally to draw the cassette holder in that direction, whereby the latter assumes a position shown in Fig. 1.

Since different cassettes are found to be of different weights, it is necessary from time to time to adjust the degree to which the spring is coiled around the stud 25 in order that when a heavy cassette is used, increased contraction of the spring is obtained, whereas when a lighter cassette is used, decreased contraction may be had. This adjustment is made possible by the presence of a pawl 24a mounted on the casing 24 by means of a suitable stud 24b. If a heavier cassette is to be used, or if the action of the mechanism under the influence of the spring is too sluggish, it is merely necessary to turn the stud 25 together with the ratchet 29 relative to the casing 24 and pawl 24a in the direction to tighten the coil spring 26 about the stud. When the proper degree of adjustment has been attained it will be readily understood that the pawl 24a will prevent return movement of the stud, and the spring will remain more tightly coiled therearound and will therefore urge the piston rod-cylinder assembly together with the cassette holder A toward the inoperative position shown in Fig. 1, with increased intensity.

As previously explained, to permit the cassette holder to travel through the above motion without providing some means for preventing shock, causes a considerable jarring of the entire mechanism, with the result that the exposures are often unsatisfactory. In the present instance, however, the lower end of the piston is provided with a novel arrangement whereby not only is jarring eliminated by the creation of a vacuum as the forward cassette holder reaches the end of its lateral movement, but also, the creation of the vacuum is so controlled that the return movement is accomplished rapidly and with ease, and requires no great effort on the part of the operator.

The casing 31a housing this valve arrangement, and, as previously described, constituting the closure cap for the lower end of the cylinder 31, includes a one-way valve passage 34 controlled by a ball valve and spring assembly 34a. The passage is so constituted and the ball valve so arranged therein that the flow of air is free to pass from within the cylinder, beneath the piston on the rod 26, into the atmosphere, but so that reverse flow from the atmosphere to the cylinder is restricted. There is also included in the casing 31a a permanent restricted relief duct shown generally at 35, which is in turn controlled by a needle valve 36.

In order that the operation of these passages may be properly understood, the pressure conditions within the cylinder 31 throughout the various positions it assumes during the lateral travel of the cassette holder A, will be explained. Referring first to Fig. 2, wherein the cassette holder A and the cylinder-piston rod arrangement is in operative position, it will be seen that the unitary arm formed by the piston rod and cylinder is in a somewhat extended position whereby the piston 27a is in a position part way up the cylinder chamber. However, upon release of the latch 33 by manipulation of the handle 33a the spring 26 urges the cassette holder laterally toward the right, as seen in Fig. 2, and the unitary arm toward a vertical position. During this movement it will be seen that the piston 27a has moved downwardly in the cylinder, with the result that the air beneath the piston has been compressed. This latter movement will be referred to as the first or compression phase of the cassette movement. During this period it will be seen that, because of the direction of the check valve, the compressed air flows readily from the cylinder to the atmosphere so as not to retard the speed of movement under the influence of the spring. This escape of air is accomplished through the one-way passage 34 and through the escape passage 35 in the casing 31a. The second, or vacuum phase of the operative movement of the cassette holder and piston rod-cylinder arrangement takes place during the movement of the cylinder from its vertical position shown in dotted lines in Fig. 2 to the position shown in Fig. 1. While during the first phase the total arm length of the piston rod-cylinder arrangement was shortened and the piston moved downwardly, during the second phase it will be seen that it is again lengthened and the piston movement reversed, that is, the piston 27a during this period moves away from the bottom of the cylinder. It is this lengthening of the arm and the resulting vacuum which is utilized to brake the rapid movement of the cassette holder A and bring it to its extreme position of rest without jarring the entire mechanism. Referring again to Fig. 7 it will be seen that during this second or vacuum phase of the movement the ball valve 34a will be seated, thus the only admission of air to compensate for the vacuum created will be through the passage 35. Consequently, upon proper regulation of the needle valve 36 the admission of air is such that while complete movement of the cassette holder A toward the right is permitted, this movement will nevertheless be slowed down due to the retarded flow of air through passage 34 and a cushioning will result. Summarizing this movement of the cassette holder A from operative to inoperative position, it will be readily understood from the foregoing that during the first part of the lateral movement, that is, the first or compression phase, there will be no restrictions upon the spring action and the movement will be made with utmost rapidity, which, as previously explained, is highly desirable. This condition will continue until the cylinder has moved beyond its vertical position, at which time the second or vacuum phase is entered into, whereupon, due to the check valve 34a, the admission of air is restricted to the retarded passage 35 and movement of the cassette holder from then on will become increasingly slow as the vacuum is increased. This vacuum is not broken except for this retarded flow of incoming air through the restricted passage 35, one purpose of the latter being to prevent the locking of the holder in a position short of its maximum movement into its inoperative position. It will be readily understood that the valve 36 may be regulated to entirely close the passage 35 if desired.

The valving arrangement above described also plays an important part in facilitating the movement of the cassette holder A from its inoperative position back to the exposure station. It will be readily understood that throughout this movement the above mentioned phases are reversed. During the first part of the movement there will be a compression phase and, as above explained, flow of air from the chamber will be free and the movement of the cassette holder may be made rapidly and with ease. Since, however, the manual return movement of the cassette holder is considerably slower than the operative movement under the influence of the spring 26, it is found that when the needle valve 36 is properly regulated, the passage 35, though restricted, is sufficiently large to permit a sufficiently free inflow of air so that the operator's movement of the cassette holder A toward the operative position is not retarded.

From the foregoing it will be seen that the operation of the device is accomplished without the use of counterbalances or of a balanced system. In such a system the proper weight of the cassettes is a factor upon which successful operation is dependent. With the foregoing construction and with the regulating features thereof, the operation is entirely independent of the weight of the cassettes and the mechanism can be adapted to any weight involved.

As previously explained, the lapse of time between the exposure on the forward cassette holder A and the exposure upon the rear cassette holder B should be as short as possible in view of the fact that movement of the patient, such as drawing of a breath or release of a breath, if a chest photograph is being taken, means that the stereoscopic view may be made up of two different photographs. This lapse of time, therefore, should be instantaneous. In the past an independently operable release mechanism for the rear holder has been used, or a separate release mechanism operable by the movement of the forward cassette holder has been used. In either case the lapsed time between the exposure of the two photographs has been of relatively long duration and the added expense and complication of the extra mechanism has been found undesirable. To alleviate this difficulty there is provided herein a coacting rear cassette holder which maintains its position solely by virtue of abutment with the forward cassette holder and which assumes the proper operative position upon removal of the latter to an inoperative position. Consequently the added operation of releasing the second holder has been eliminated, and furthermore a second release mechanism is done away with.

Extending horizontally across the lower end of the frame is a rod 37 mounted by its ends upon frame elements 10 and 12. The cassette holder B is similar in construction to the forward cassette holder except that rods 38 and 39 extend across the rear thereof, these rods being secured at their ends to rearwardly extending lugs 40 and 41 respectively. It will be understood that while the movement of the front cassette holder A is lateral to and from the operative, exposure position, the movement of the rear cassette holder B is merely forward and downward and backward and upward to and from the operative, exposure position. In order that the latter movement of the rear cassette holder may be accomplished, there is provided herein a pair of elongated H-shaped hinges for cooperating with each of the rods 38 and 39 respectively. These hinges include central cross bars 42 and 43, which cross bars have at their ends transverse portions 44 and 45 respectively. Each of the portions 44 and 45 are bored at their extremities, the bores at the upper extremities being adapted to rotatively receive the respective ends of rods 38 and 39, while the bores at the lower extremities thereof are adapted to receive the rods 23 and 37 respectively.

The path of movement of the cassette holder B from the upper-rearward inoperative position to the lower-forward exposure position is shown clearly in Fig. 5. This movement, as will be readily understood, is accomplished merely by the gravitation of the holder from its rearward position to its forward position.

In order to obtain maximum efficiency and in order that a minimum period of time shall elapse between the exposure on the plate in the forward cassette holder and the plate in the rear cassette holder, it is desirable that the rear cassette holder move into its operative, exposure position immediately upon completion of the lateral movement of the forward cassette holder. Furthermore, in order to facilitate and simplify the operation and the cost of the entire mechanism it is highly desirable that the cassette holder B move automatically into its inoperative position upon the return movement of the cassette holder A into its operative position. The above operations are accomplished herein by the provision of a roller 46 mounted at the top inner corner of the cassette holder A and a like roller 47 mounted at the lower inner corner thereof. Each of these rollers may be mounted upon the cassette holder A for movement therewith in any suitable manner, for instance, as by lugs 46*a* and 47*a*. Mounted integral with the rear cassette holder B at the upper and lower inner corners thereof are cam elements 48 and 49 respectively, these elements being adapted to cooperate with the rollers 46 and 47 on the cassette holder A respectively.

The cooperation between the cassette holders during the operation of the device is as follows: When the front cassette holder A is in its operative, exposure position as shown in Figs. 2, 4, and 6, the rollers 46 and 47 engage flanges 50 and 51 which are upstanding and depending respectively of the cassette holder B and thus hold the latter in its rearward, upper position. Assuming now that the exposure on the forward cassette holder A has been made, the operator releases the latch 33 by manipulation of the handle 33*a* with the result that the spring 26 urges the cassette holder A into its inoperative position shown in Figs. 1 and 3, as previously described. During this latter movement of the cassette holder A it will be seen that the rollers 46 and 47 have travelled inwardly along the face of flanges 50 and 51 until the face of cams 48 and 49 have been reached, whereupon the rear cassette holder B will drop forwardly and will have attained its extreme forward exposure position as the rollers 46 and 47 move out of engagement therewith. After the second exposure has been completed upon the cassette in the holder B the operator then grasps the handle A' and by moving the latter toward the left, as viewed in Figs. 1 and 2, moves the cassette holder A toward its operative position again. During this movement it will be seen that the rollers 46 and 47 again engage the face of cams 48 and 49 and in doing so urge the cassette holder B rearwardly upon the hinge elements whereby the latter again assumes the position shown in dotted lines in Fig. 5. Consequently it will be seen that the operator need exercise no initiative or control of any kind over the rear cassette holder B and that the movements thereof are accomplished solely by movements imparted to the front cassette holder B. From the foregoing it will be seen that no delicate latching mechanism is necessary in order to properly control the movements of the rear cassette holder in order that a minimum of lapsed time exists between the exposures. Furthermore, the only latch or release mechanism necessary in the entire device is the one of very simple and elementary construction designated at 33.

In order that the mechanism is not jarred by the gravity drop of the rear cassette holder, there is provided herein an expansion spring 52 having one end fixed to the cross rod 39 on the rear cassette holder and the other fixed adjustably by thumb nut 53 to the cross rod 23 on the frame structure. By means of the thumb nut 53 the tension of the spring may be adjusted so that it retards the downward-forward movement of the cassette holder B sufficiently to permit any abrupt abutment, yet will permit it to assume its lowermost position.

From the foregoing explanation of the combined spring-vacuum cylinder assembly it will be seen that extremely rapid yet controlled movement of the cassette holders has been accomplished without the use of cumbersome counter balances, complicated release mechanism, and compression chambers and springs which are unduly large. Also, the movement of the rear holder, both to and from its operative position, is entirely automatic.

While the vacuum assembly here described is highly efficient, a mechanical assembly shown in Figs. 8, 9 and 10 including a cylinder 54 having an open bottom 55 and a tension spring 56 having its upper end secured to the spider 57 and its lower end secured to the lower end of the cylinder, may be utilized instead of the vacuum chamber shown in Figs. 1 to 7. Any suitable adjustment means, such as a buckle assembly 58 adjustable through nut 58*a*, may be provided at either end of the spring. It will be seen that as the front cassette holder moves through the above described first phase, from its operative to its inoperative station, that is, from the position shown in Fig. 9 to that shown in Fig. 10 the spring 56 will be contracting due to the downward movement of the upper half of the lever arm constituting a cylinder-rod assembly, thus its movement through this phase will not be retarded. However, after the lever arm has passed the vertical position and moves into the second phase of its movement, that is, from the position shown in Fig. 10 to that shown in Fig. 8 the lever arm begins to extend in length, and the spring 56 is then stretched and thus retards the movement of the holder as it approaches its inoperative position.

Having thus described the invention, what I claim as new and desire to secure by United States Letters Patent is:

1. In a device of the class described, a housing frame, rail means mounted horizontally across said frame, a cassette holder, roller elements carried by said cassette holder, said roller elements engaging said rail elements, a handle connected with said holder to afford manual, horizontal, lateral manipulation thereof from an inoperative, shielded station to an operative exposure station, a transporting assembly, said transporting assembly including in combination, a torsion spring and an angularly movable piston-cylinder assembly, a mounting element for anchoring said spring, said element being mounted on the housing, said piston having a piston rod pivotally associated with said mounting and having its upper end bearing against the free end of said spring to be urged through operative angular movement thereby, said cylinder receiving said piston in operative relationship and having its lower end pivotally secured to said cassette holder, and a one-way inwardly closing check valve at the lower end of said cylinder.

2. In a two-station X-ray cassette changer, a housing frame, a pair of cassette holders mounted on said frame for movement relative thereto from an operative exposure position to an inoperative position, said holders being positioned one forward of the other preparatory to the exposure of the plate in the forward holder, means for mounting said forward holder for lateral movement relative to the frame, and means for mounting the rear holder for forward and backward movement relative thereto, an expansion spring associated with said rear holder for cushioning its forward movement to prevent jarring of the mechanism, said spring having one end secured to a portion of the holder and its other end secured to a portion of the housing frame, means for urging the forward cassette holder from an operative to an inoperative position, said means including a torsion spring and a piston cylinder assembly, means for anchoring one end of said spring to said housing frame, a piston rod associated with said piston, a pivotal connection between the upper end of said piston rod and said housing frame said connection providing a pivot axis coaxial of said torsion spring, said cylinder being operatively associated with said piston and having its lower end pivotally secured to the forward cassette holder, and an inwardly closing check valve in the lower and of said system cylinder.

3. In an X-ray cassette changer, a housing frame, a pair of cassette holders mounted on said frame for movement relative thereto from an operative exposure position to an inoperative position, said holders being positioned one forward of the other preparatory to the exposure of the plate in the forward holder, means for mounting said forward holder for lateral movement relative to the frame, and means for mounting the rear holder for forward and backward movement relative thereto, said last named holder being normally held in its rear position by abutment with the forward holder when it is in its operative position, an angularly, rearwardly extending cam on said rear cassette holder and cam engaging means on said forward cassette holder for engaging said cam as the forward holder is moved toward its operative position.

4. In a two-station X-ray cassette changer, a housing frame, a pair of cassette holders mounted on said frame, supporting elements mounted horizontally across said frame, said holders being positioned one behind the other preparatory to the exposure of the plate on the forward cassette holder, rollers on the forward holder, said rollers engaging certain of said horizontal supporting elements to afford lateral movement of said holder, rigid hinge members each having one end pivoted to said rear holder and the other end pivotally secured to certain of said horizontal supporting elements to afford forward and backward movement of said holder, a cam extending rearwardly of said last named holder, a cam engaging element on said forward holder, said cam and said element engaging upon movement of the forward holder toward its operative position.

5. In an X-ray cassette changer having an operative, exposure station and an inoperative station, a pair of cassette holders each mounted in said changer for movement into and out of operative position, one of said holders being movable laterally of said changer from the exposure station to the inoperative station, tension means for urging said laterally movable holder toward the inoperative position from the operative position, said tension means including a torsion coil spring mounted on said changer in the vicinity of the inoperative station and having one end anchored thereto, a piston rod mounted on said changer to pivot coaxially of said spring at its upper end, the free end of said spring engaging the piston rod to urge it through pivotal movement toward the inoperative station as it uncoils, a piston at the lower end of said rod, a cylinder for receiving said piston through its upper end and having a pivotal connection with said laterally movable holder at the lower end thereof, said piston rod and cylinder constituting a lever arm unit, a one way, inwardly closing check valve in the lower end of said cylinder, and a latch mechanism for maintaining said holder in its operative position until after an exposure has been made.

6. A governor for a two station X-ray cassette changer of the type having an operative, exposure station and an inoperative station, a pair of cassette holders, each mounted in said changer for movement into and out of operative position, one of said holders being movable laterally of said changer from the exposure station to the inoperative station, means for urging said laterally movable holder toward the inoperative position from the operative position, exposure position and releasable means for latching said holder in operative position, said governor including a piston rod having its upper end pivoted to the changer structure in substantially the center of the portion of the changer constituting the inoperative station, a piston at the lower end thereof and a piston cylinder, a pivotal connection between the lower end of said cylinder and the adjacent edge of the laterally movable holder as it is in the operative position, and a one way check valve in the lower end of said cylinder, for restricting the free flow of air into said cylinder and for admitting free flow of air from said cylinder to the atmosphere.

7. A governing assembly for an X-ray cassette changer of the type having operative and inoperative stations, a cassette holder mounted for lateral movement relative thereto during its travel from an operative, exposure station to an inoperative station after exposure of a film thereby, means for urging said holder from an operative station to an inoperative station and latch means for releasably holding said holder at an operative station until after such exposure, said governing assembly including a telescopic sectioned lever arm having one end pivotally connected with the changer and the other end pivotally connected with the holder, said connections being so located relative to one another when the holder is at the operative station, that said lever arm assumes a position of angularity and so that one connection must entirely pass the other to substantially reverse the angular position of the arm during the travel of the holder from an operative, exposure station to an inoperative station, and means operatively associated with said sectioned telescopic arm for enhancing free contractive movement of said sections and for restricting the expansive movement thereof.

8. A governor for a two station X-ray cassette changer having an operative, exposure station and an inoperative station, a pair of cassette holders, each mounted in said changer for movement into and out of operative position, one of said holders being movable laterally of said changer from the exposure station to the inoperative station, means for urging said laterally movable holder toward the inoperative position from the operative, exposure position and releasable means for latching said holder in operative position said governor including a piston rod having its upper end pivoted to the changer structure in substantially the center of the portion constituting the inoperative station, a piston at the lower end thereof and a cylinder for receiving said piston, a pivotal connection between the lower end of said cylinder and the adjacent edge of the laterally movable holder as it is in the operative position, a one way, inwardly closing check valve in the lower end of said cylinder, and a passage in the lower end of said cylinder for admitting free flow of air in either direction and having a valve associated therewith to regulate the rate of the passage of air therethrough.

9. A governor for an X-ray cassette changer of the type having a mounting frame divided into operative and inoperative stations, a cassette holder mounted on said frame for movement from station to station and means for urging said holder from the operative station to the inoperative station, said governor including a freely contractible and retardedly expansible link having one end pivotally connected to said frame and the other end pivotally connected to said cassette holder, each of the pivotal connections being located in a different vertical plane through the frame as said frame is in a vertical upright position to afford horizontal travel of the cassette holder from station to station and each being so located horizontally on said frame relative to one another as the holder is at the operative station that said link assumes an angular position and so that one pivotal connection must entirely pass the other to substantially reverse the angle of the link as the holder travels from one station to the other.

10. In an X-ray cassette changer of the type having operative and inoperative stations, a cassette holder mounted for lateral movement thereof during its travel from an operative, exposure station to an inoperative station after exposure of a film thereon, means for urging said holder from an operative station to an inoperative station, latch means for releasably holding said holder at an operative station until after such exposure, a governing assembly for controlling the rate of movement of said holder toward an inoperative station, said assembly including a telescopic, sectioned lever arm having one end pivotally connected with the changer and the other end pivotally connected with the holder, said connections being so located relative to one another when the holder is at the operative station, that said lever arm assumes a position of angularity and so that one connection must entirely pass the other to substantially reverse the angular position of the arm during the travel of the holder from an operative, exposure station to an inoperative station, and a tension spring having one end secured to the free end of one section of said lever and the other end secured to the free end of the other section for retarding relative expansive movement of said sections.

11. In an X-ray cassette changer of the type having a pair of cassette holders mounted one in front of the other at an operative station and in which the front holder is movable lengthwise of the changer to an inoperative position and the rear holder is movable forwardly to its operative position, a cam assembly including a cam element on the rear holder and a cooperating cam element on the front holder for engaging said first named cam element to urge the rear holder into its rear inoperative position upon movement of the forward holder into its operative position.

12. In a cassette changer of the class described, a cassette holder mounted thereon for movement from an operative to an inoperative position, tension means for urging said holder from the operative to the inoperative position, said tension means including a coiled torsion spring mounted on said changer and having one end anchored thereto, a lever arm pivotally mounted on said changer to pivot coaxially of said spring at the end mounted on the changer, the free end of said spring being formed to bear against the lever to urge it through angular movement about said pivoted end toward the inoperative station, the other end of said lever having a pivotal connection with said cassette holder, and a latch for releasably maintaining said holder in the operative position.

13. In a cassette transport mechanism for an X-ray cassette changer, in combination, a frame, a cassette holder movable laterally of said frame, motivating means for shifting said holder laterally within the frame, means connecting said motivating means to said holder, and a control for governing the movement of said holder under the influence of the motivating means, said control including means for opposing the action of said motivating means only as the holder approaches the end of its path of travel.

PARKMAN N. CARL.